United States Patent [19]

Utley et al.

[11] Patent Number: 5,317,248
[45] Date of Patent: May 31, 1994

[54] MICRO-CONTROLLER BASED PWM WAVEFORM GENERATION FOR A MULTIPLE PHASE AC MACHINE

[75] Inventors: Daniel E. Utley, Anderson; Kevin M. Deasy, Noblesville; Gordon D. Cheever, Jr., Kokomo, all of Ind.

[73] Assignees: General Motors Corporation, Detroit, Mich.; Delco Electronics Corp., Kokomo, Ind.

[21] Appl. No.: 975,295

[22] Filed: Nov. 12, 1992

[51] Int. Cl.$^5$ .............................................. H02P 5/28
[52] U.S. Cl. .................................. 318/811; 318/801; 318/802
[58] Field of Search .................... 318/811, 801, 802

[56] References Cited

U.S. PATENT DOCUMENTS

| | | | |
|---|---|---|---|
| 4,489,267 | 12/1984 | Saar et al. | 318/811 |
| 4,599,550 | 7/1986 | Robertson, Jr. et al. | 318/811 |
| 4,615,000 | 9/1986 | Fuji et al. | 318/811 |
| 4,739,240 | 4/1988 | MacMinn et al. | 318/696 |
| 4,802,077 | 1/1989 | Fuji et al. | 318/811 |

OTHER PUBLICATIONS

*Automotive Design Engineering*, "Sine Wave Generation for Electric Vehicle AC Motor Drive", by Jeff Baum & Ken Berringer, pp. 326–330, 1992.

Primary Examiner—William M. Shoop, Jr.
Assistant Examiner—Karen Masih
Attorney, Agent, or Firm—Mark A. Navarre; A. L. Simon

[57] ABSTRACT

A multi-processor AC motor control system having a timer processor which generates multiple synchronized PWM waveforms while minimizing software latency effects. The timer processor generates a 50% PWM duty cycle sync signal at the PWM frequency, creating a logic level transition (leading edge) in each PWM period. At each such transition, the timer processor interrupts the host processor for the purpose of updating a multi-byte timer data register with PWM on-time data stored in nonvolatile memory as a function of machine position and requested current. A separate timer channel is provided for each PWM waveform to be generated, and the timer processor sets off-to-on and on-to-off transitions of each waveform in accordance with the updated PWM on-time data such that respective off-to-on and on-to-off transitions in each waveform are centered about the leading edges of the sync signal. If the on-time is 0% or 100%, the timer processor overrides the normal instruction set and forces the logic state of the waveforms to a full-off or full-on logic state.

6 Claims, 7 Drawing Sheets

| SINEWAVE #1 | SINEWAVE #2 | 0|0|0|0|0|0|0|0 | SINEWAVE #3 |
| 0|0|0|0|0|0|0|0 | SINEWAVE #1 | SINEWAVE #2 | 0|0|0|0|0|0|0|0 |
| 0|0|0|0|0|0|0|0 | SINEWAVE #1 | 0|0|0|0|0|0|0|0 | SINEWAVE #2 |
| 0|0|0|0|0|0|0|0 | SINEWAVE #2 | 0|0|0|0|0|0|0|0 | SINEWAVE #1 |

MICRO-CONTROLLER BASED PWM WAVEFORM GENERATION FOR A MULTIPLE PHASE AC MACHINE

This invention relates to a micro-controller based pulse-width-modulation (PWM) control of a multiple phase AC machine, and more particularly, to an efficient method of computer-based PWM waveform generation which produces multiple mutually synchronized and centered PWM waveforms while minimizing software latency effects.

BACKGROUND OF THE INVENTION

Operating an AC machine from a DC power source typically requires the use of a solid state inverter for establishing a rotating magnetic field in the stator of the machine. To reduce motor losses, the switching devices of the inverter are generally pulse-width-modulated at a relatively high frequency (such as 20 kHz) so that the current supplied to the stator windings is substantially sinusoidal. Traditionally, this is achieved with discrete digital and/or analog circuit elements, such as reference sine and triangle-wave generators and comparators.

More recently, there has been a trend toward the use of micro-processor based controllers, in which the inverter conduction patterns are stored in nonvolatile memory as a function of rotor position and requested current amplitude. However, the throughput requirements of practical applications exceed the capability of most processors. If the processor is supplemented by discrete gating and timing devices in order to meet the throughput requirements, the cost-effectiveness of this approach is greatly reduced.

The above deficiencies have been remedied to a large extent by multi-processor micro-controllers, such as the MC68332, manufactured by Motorola Inc., Phoenix Ariz. These micro-controllers include both a host processor for carrying out main system control functions, and a timer processor which operates in parallel with the host processor to carry out time function tasks. However, the time required by the timer processor to execute its instruction set creates a software latency which limits the ability of the control system to synchronize output signals and to respond fast enough under certain conditions.

SUMMARY OF THE PRESENT INVENTION

The present invention is directed to an improved method of operation for a timer processor of a multi-processor AC motor control system, wherein the timer processor generates multiple synchronized PWM waveforms while minimizing software latency effects.

The timer processor generates a single 50% PWM duty cycle sync signal (SYNC) at the PWM frequency, creating an identifiable logic level transition (referred to herein as a leading or rising edge) in each PWM period. At each such leading edge, the timer processor interrupts the host processor for the purpose of updating the timer channel registers with PWM on-time data stored in a multi-byte timer data register (TDR).

A separate timer channel is provided for each PWM waveform to be generated, and the timer processor sets off-to-on and on-to-off transitions of each waveform in accordance with the updated PWM on-time data such that respective off-to-on and on-to-off transitions in each waveform are centered about the rising edges of the sync signal. Specifically, the timer processor initializes a respective timer channel at each transition of the PWM waveforms so that the next transition of that waveform will occur (on-time/2) before or after the next rising edge of the sync signal.

If the requested on-time is 0% or 100%, the timer processor overrides the normal instruction set and forces the logic state of the waveforms to a full-on or full-off logic state. In this way, the control is able to achieve 0% and 100% Pwm duty cycles despite a latency period due to the time required by the processor to execute its instruction set.

BRIEF DESCRIPTION OF THE DRAWINGS

FIGS. 4a-4b depict a method of transferring on-time data from the timer data register to individual registers of the timer processor of FIG. 1.

FIGS. 5a-5b depict flow diagrams representative of computer program instructions executed by the timer processor of FIG. 1 in the generation of the sync waveform of FIG. 2a.

DETAILED DESCRIPTION OF THE DRAWINGS

Figure 1:
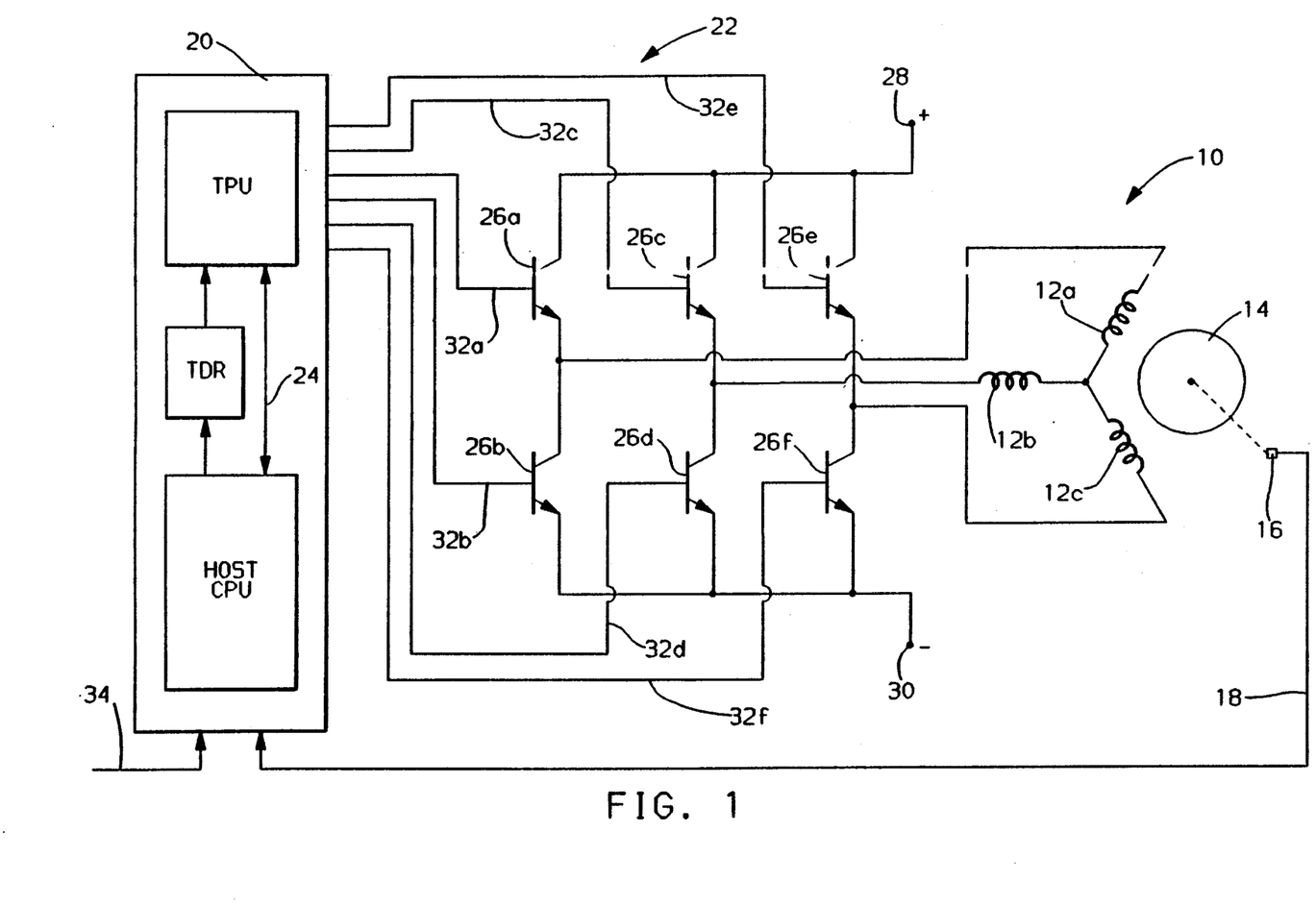
FIG. 1 is a system diagram schematically depicting the host processor, the timer data register, the timer processor, an inverter and a controlled AC induction motor.

Referring to FIG. 1, the reference numeral 10 generally designates a three-phase AC induction machine having WYE-connected stator phase windings 12a, 12b and 12c, and a shorted turn rotor 14. An encoder 16 mechanically coupled to rotor 14 provides periodic electric pulses on line 18 at a frequency based on rotor displacement. The time between such pulses is used, as indicated below, as a measure of the periodic change in rotor position.

The stator phase windings 12a-12c are energized with electric current by a control system comprising a micro-controller 20 and full-wave inverter 22. The inverter 22 comprises six power transistors 26a-26f, and is connected to a DC voltage source (not shown) as indicated by the + and − designations at terminals 28 and 30, respectively. The transistors 26a-26f are individually turned on and off by micro-controller 20 as explained below via control signal lines 32a-32f.

The micro-controller 20, which may be a Motorola MC68332 or equivalent, comprises in pertinent part, a Host Central Processor Unit (HOST CPU), a Timer Processor Unit (TPU) and a Timer Data Register (TDR). Bi-directional communication between the HOST CPU and the TPU is achieved via bus 24. As explained in further detail below, the HOST CPU periodically develops PWM conduction periods or on-times for each motor phase, and stores the same in the TDR for transfer to the TPU, which in turn, develops the PWM control signals PWM1, PWM2 and PWM3 for inverter transistors 26a–26f.

The TPU includes several timer channels, and the HOST CPU configures four of the channels for the development of dual-edged synchronized Pwm control signals for the inverter transistors of each motor phase, as explained below. One channel (CH0) is configured to develop a synchronization (SYNC) signal, and three other channels (CH1, CH2, CH3) are configured to develop the control signals for the three motor phases.

The phase-specific on-times (HIGHTIME(1), HIGHTIME(2), HIGHTIME(3)) provided to the TDR by the HOST CPU are determined in response to the desired current amplitude (AMPLITUDE), the desired slip (SLIP) and the position (ROTPOS) of rotor 14 so as to produce substantially sinusoidal motor current. This is achieved in the preferred embodiment through a table look-up of previously stored on-times as a function of the desired AMPLITUDE and a signal (STATOR ANGLE) representative of the desired phase-lead or phase-lag of the magnetic field created by the stator windings 12a–12c relative to the rotor 14.

The desired AMPLITUDE is determined in response to a demand signal such as a motor/generator torque command signal on line 34. If the machine 10 is utilized as an automotive starter/generator, for example, the demand input may be based on parameters such as engine throttle position, brake effort, etc. The STATOR ANGLE is determined as a combined function of the rotor position information provided by encoder 16 and the desired slip of the machine. The magnitude of the slip may be fixed, while its sign depends on whether the machine is operating as a motor or a generator.

Figure 2A:
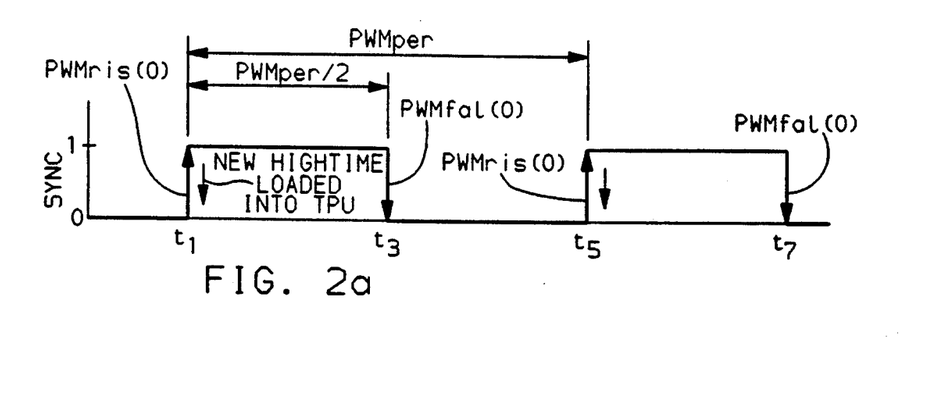
FIGS. 2a-2b graphically depict representative sync and PWM waveforms generated by the timer processor of FIG. 1.
Figure 2B:
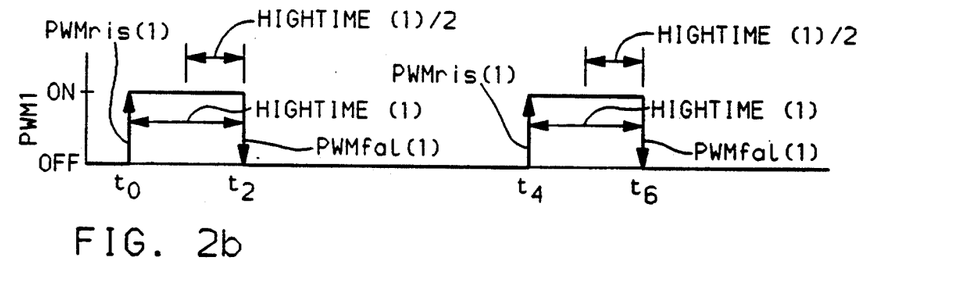

FIGS. 2a and 2b respectively depict the SYNC signal of timer channel CH0 and the PWM control signal (PWM1) of timer channel CH1 on a common time base. The channel CH0 of FIG. 2a is configured by the HOST CPU so that the SYNC signal has a 50% duty cycle at the PWM period PWMper. Consequently, the SYNC signal has a rising or leading edge, designated as Pwmris(0), at the beginning of each PWM period, and a falling or trailing edge, designated as PWMfal(0), at the midpoint of the PWM period. These logic level transitions are used by the TPU to trigger updating of the on-time data by the HOST CPU and to synchronize the development of the PWM control signals Pwm1, PWM2 and PWM3 so that they are centered about Pwmris(0).

At each occurrence of PWMris(0), time t1 for example, the TPU interrupts the HOST CPU to initiate updating of the on-time data stored in the TDR, and to compute the timing of the next two logic level transitions PWMfal(0) and PWMris(0), respectively. This functionality is detailed in the flow diagrams of FIGS. 3b, 4a and 5a. The updated on-time data and the computed timing of PWMris(0) are then used by the TPU at the logic level transitions of each PWM control signal to compute the timing of the next respective logic transition; this functionality is detailed in the flow diagrams of FIGS. 6a–6c.

Referring to FIGS. 2a–2b, for example, the TPU is interrupted at time t1—Pwmris(0)—to compute the time t3 of the falling edge Pwmfal(0) and the time t5 of the next rising edge PWMris(0). With respect to channel CH1, the TPU is interrupted once at time t2—PWMfal(1)—to compute the time t4 of the next rising edge PWMris(1) based on HIGHTIME1 and the computed time t5, and again at time t4—Pwmris(1)—to compute the time t6 of the next falling edge PWMfal(1), again based on HIGHTIME1 and the computed time t5.

Figure 3A:
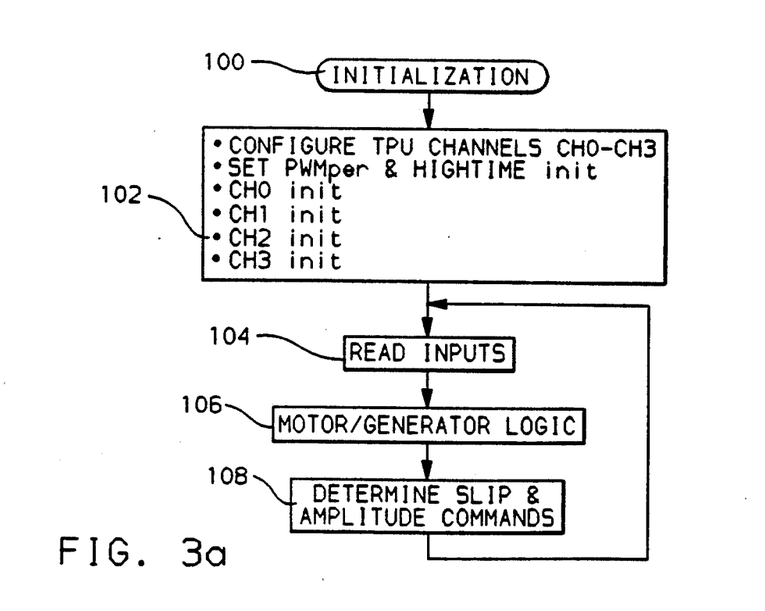
FIGS. 3a-3b depict flow diagrams representative of computer program instructions executed by the host processor.

As indicated above, the flow diagrams of FIGS. 3a–3b, 4a, 5a–5b and 6a–6c represent computer program instructions executed by the HOST CPU and the TPU in carrying out the waveform generation described in reference to FIGS. 2a–2b. FIG. 3a is a main loop flow diagram executed by the HOST CPU, including the TPU initialization and the determination of SLIP and AMPLITUDE. A service routine executed by the HOST CPU in response to periodic interrupts generated by the TPU for updating the TDR on-time data is depicted by the flow diagrams of FIGS. 3b and 4a and the chart of FIG. 4b. The initialization and servicing of the TPU SYNC channel CH0 is detailed in the flow diagrams of FIGS. 5a–5b, while the initialization and servicing of representative PWM control signal channel CH1 is detailed in the flow diagrams of FIGS. 6a–6c.

Referring to the HOST CPU main loop flow diagram of FIG. 3a, the initialization instruction blocks 100 and 102 are executed at each power-up of the micro-controller 20 to initialize certain variables and registers prior to executing the main program instructions. With respect to the TPU initialization at block 102, the HOST CPU sets the PWM period Pwmper and initial on-time (HIGHTIMEinit), and initializes the TPU timer channels CH0–CH3, as designated by CH0init, CH1init, CH2init and CH3init.

In the illustrated embodiment, the on-time is initialized at 50%, which corresponds to a condition of zero current flow in the phase windings 12a–12c. The timer channel configuration typically involves setting the period, hightime and synchronization registers for each channel.

Following initialization, the HOST CPU sequentially and repeatedly executes the instruction blocks 104–108, as well as various other unrelated control function blocks, not shown. The block 104 concerns the reading of various system inputs including the encoder and motor torque demand signals on lines 18 and 34 of FIG. 1. As indicated with respect to FIG. 1, the motor torque demand signal may take the form of an engine throttle position signal in an automotive starter/generator system, for example.

The block 106 represents motor/generator logic which determines whether the machine 10 should be operating in the motoring or generating mode; in the automotive installation, this may be determined by monitoring the vehicle acceleration or application of the service brakes. The block 108 is directed to the determination of the AMPLITUDE and SLIP commands. As indicated above, the AMPLITUDE command is directly related to the demand signal input, while the SLIP command may be fixed, or determined in relation to the required torque or the desired power output of machine 10.

The execution of the main loop flow diagram of FIG. 3a is periodically interrupted in response to the generation of periodic interrupt requests by the TPU, as briefly discussed in reference to FIGS. 1 and 2a–2b. The interrupt request means that the TPU will soon need updated PWM on-time data, and the HOST CPU services the interrupt by executing the TPU INT flow diagram of FIGS. 3b and 4a. After clearing the TPU interrupt at block 110, the block 112 is executed to move the on-time data previously determined and stored in the TDR to the data registers of the PWM control signal timer channels CH0–CH3. This process involves a sequence of shift and transfer instructions, as detailed in the flow diagram of FIG. 4a and the accompanying chart of FIG. 4b.

Figure 4A:
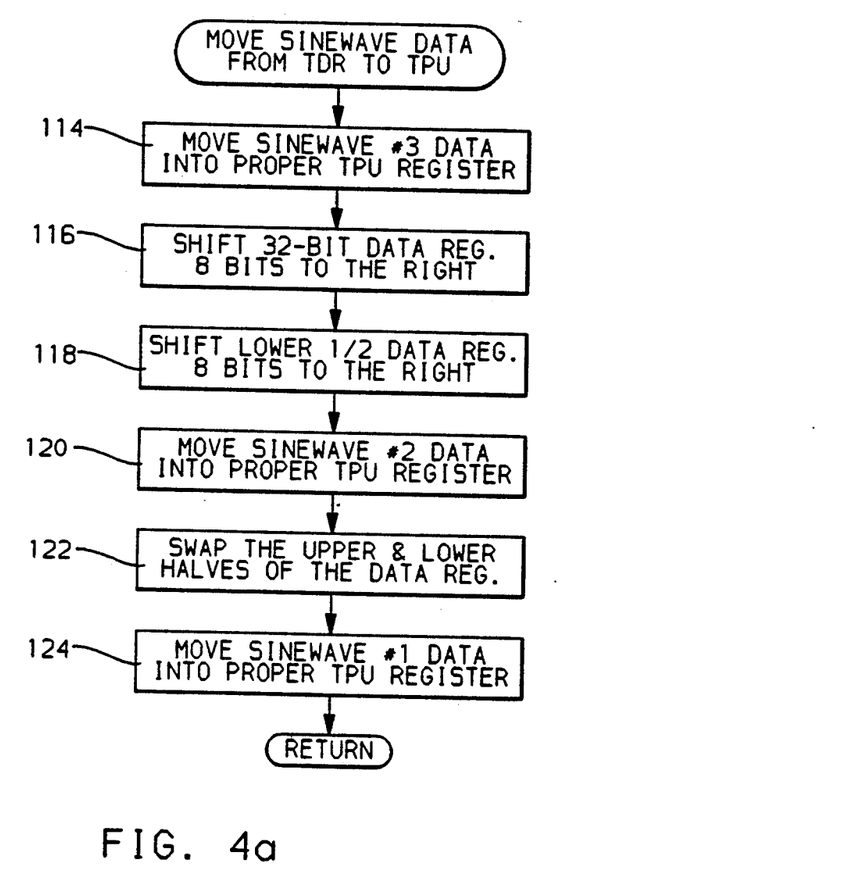
FIG. 4a depicts a flow diagram routine executed by the host processor of FIG. 1
Figure 4B:
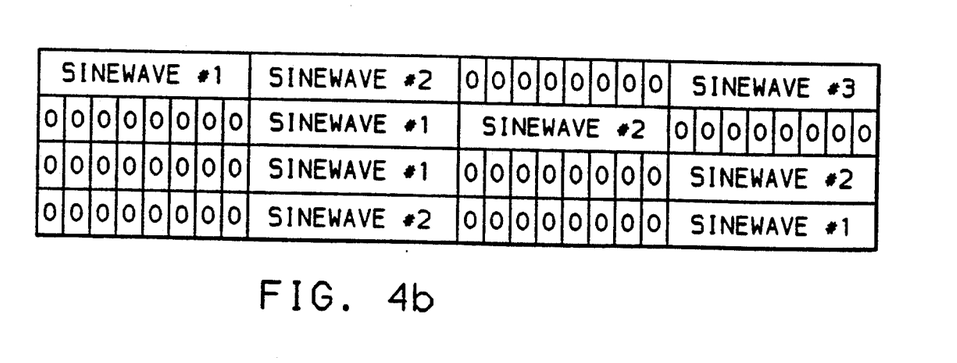
FIG. 4b is a schematic representation of the data transfer.

Referring to the top line of the chart of FIG. 4b, the TDR is 32 bits wide, accommodating four eight-bit bytes of on-time data. Since only three on-time data bytes are needed for the three-phase machine 10 of FIG. 1, one data byte is loaded with zeros as shown. First, as indicated by the blocks 114-116 and the second line of the chart, the on-time data for motor phase 3 is moved to the TPU timer channel CH3 and all of the TDR data is shifted eight bits to the right.

Next, as indicated by the block 118 and the third line of the chart, the lower half of the TDR data is shifted eight bits to the right. Then, as indicated by the blocks 120-122 and the fourth line of the chart, the on-time data for motor phase 2 is moved to the TPU timer channel C92, and upper and lower halves of the TDR data are swapped. Finally, as indicated by the block 124, the on-time data for motor phase 1 is moved to the TPU timer channel CH1, completing the data transfer.

Figure 3B:
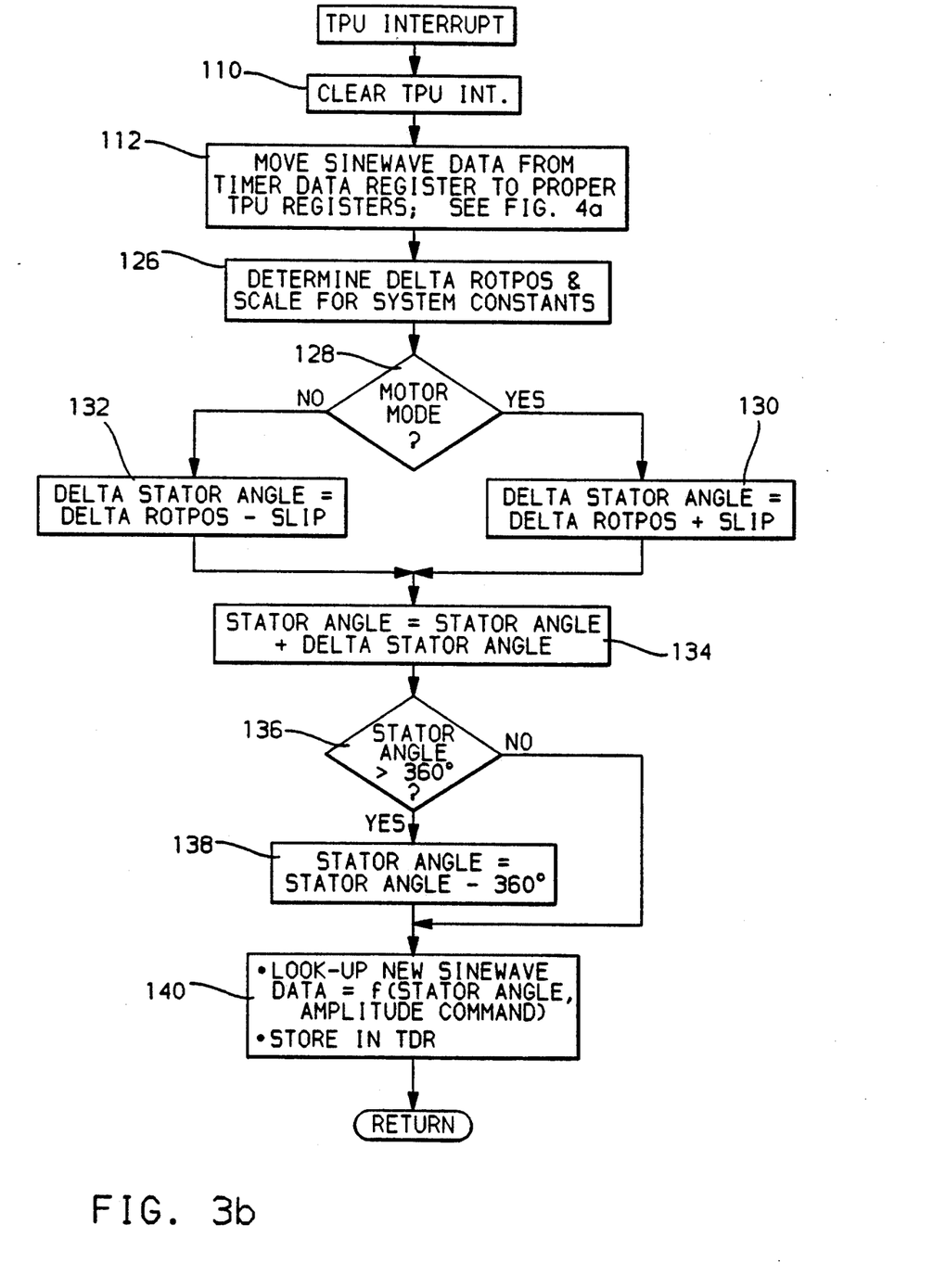

Referring again to the TPU INT flow diagram of FIG. 3b, the HOST CPU then executes block 126 to determine the change in rotor position (DELTA ROTPOS) based on the time elapsed between successive pulses of the encoder signal on line 18 of FIG. 1, and to scale DELTA ROTPOS in accordance with a system calibration constant. This constant conveniently accounts for a number of system parameters including the clock frequency of micro-controller 20, the TPU interrupt frequency, encoder parameters, the number of machine poles, etc.

The blocks 128-132 are then executed to determine the required phase change of the stator winding energization, DELTA STATOR ANGLE. If the machine 10 is operating in a motoring mode, as determined at block 128, the block 130 is executed to determine the DELTA STATOR ANGLE according to the sum (DELTA ROTPOS+SLIP). If the machine 10 is operating in a generator mode, the block 132 is executed to determine the DELTA STATOR ANGLE according to the difference (DELTA ROTPOS−SLIP). The stator energization angle, STATOR ANGLE, is then determined at block 134 according to the sum (STATOR ANGLE+− DELTA STATOR ANGLE). If the STATOR ANGLE is greater than 360 degrees, as determined at block 136, block 138 is executed to reduce the STATOR ANGLE by a full revolution, 360 degrees. Finally, the block 140 is executed to look up the on-time data for each of the three phases from a micro-controller look-up table, based on the determined STATOR ANGLE and the AMPLITUDE command. This data is then stored in the TDR, as indicated, for transfer to the PWM control signal timer channels CH1-CH3 in the next TPU interrupt.

Figure 5A:
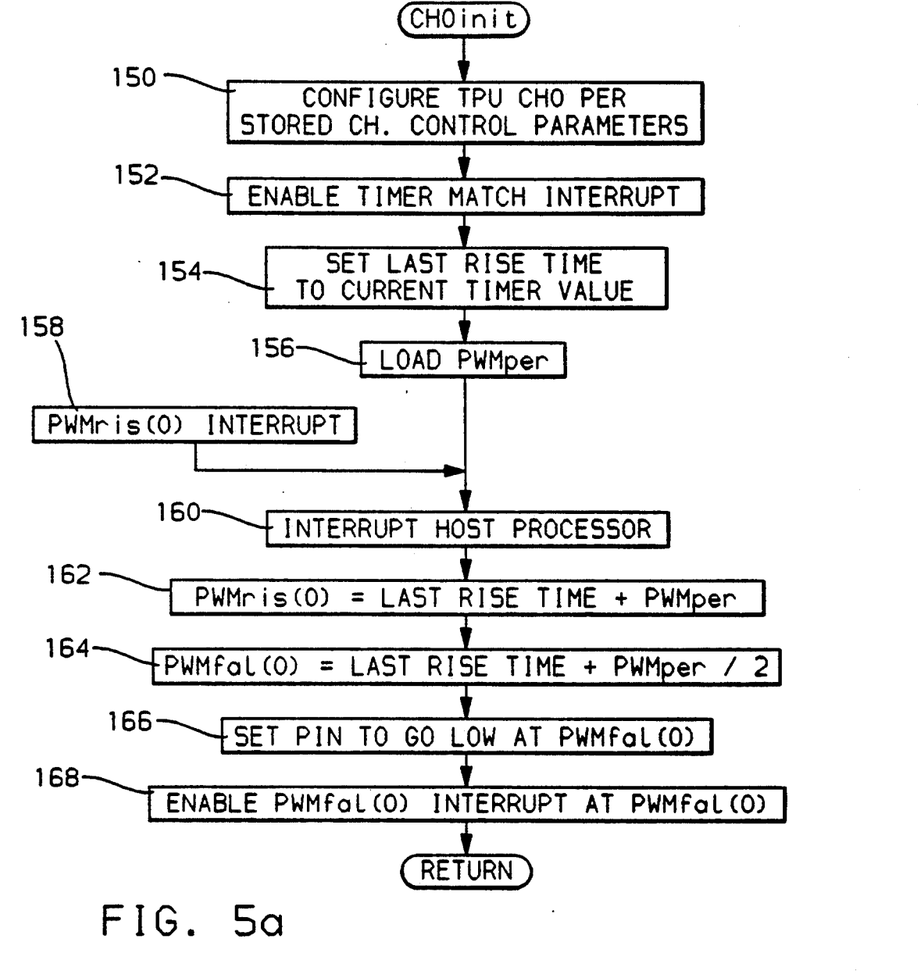
Figure 5B:
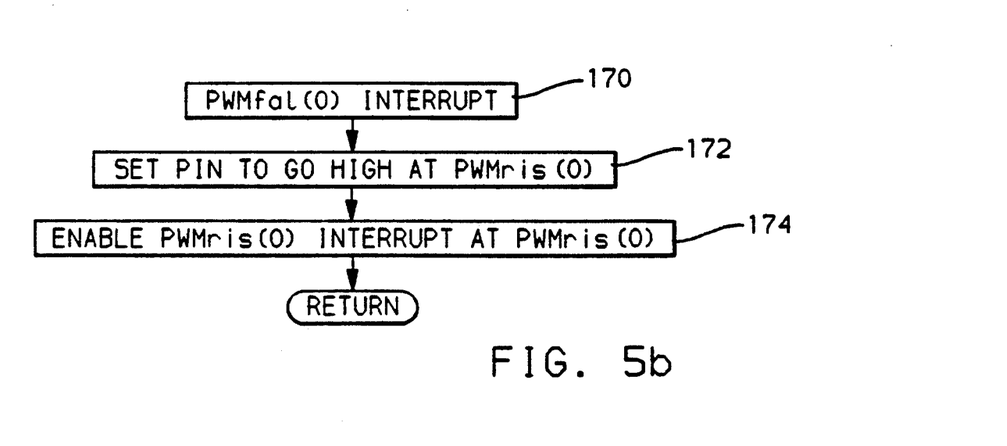

The flow diagrams of FIGS. 5a-5b detail the timer channel CH0 routines executed by the TPU in response to interrupts generated by the HOST CPU and the channel CH0 timers. As indicated above, the timer channel CH0 develops the SYNC signal graphically depicted in FIG. 2a. At system initialization, the TPU executes the blocks 150-156 in response to the CH0init instruction of the HOST CPU (block 102 of FIG. 3a). This involves setting the initial output condition of the channel (block 150), configuring the channel to generate an interrupt when the TPU timer matches a count stored in the channel register (block 152), setting LAST RISE TIME to the current TPU timer value (block 154) and loading the Pwm period Pwmper (block 156).

Following initialization, and at each subsequent rising edge PWMris(0) of the SYNC signal (as designated by block 158), the block 160 is executed to interrupt the HOST CPU, and the blocks 162-168 are executed to compute the next falling and rising edges PWMfal(0) and PWMris(0) based on the LAST RISE TIME and PWMper. The HOST CPU interrupt of block 160 causes the HOST CPU to execute the interrupt service routine of FIGS. 3b and 4a as described above for updating the on-time data stored in the timer channels CH1-CH3. The block 162 sets next rising edge time PWMris(0) to (LAST RISE TIME+PWMper). The block 164 sets the next falling edge time PWMfal(0) to (LAST RISE TIME+PWMper/2). Blocks 166-168 configure the channel CH0 to undergo a high-to-low logic level transition and to generate a PWMfal(0) interrupt when the TPU timer reaches PWMfal(0).

When the PWMfal(0) interrupt occurs at TPU timer=PWMfal(0), the TPU executes the interrupt service routine of FIG. 5b (block 170). At this time, the blocks 172-174 are executed to configure the channel CH0 to undergo a low-to-high logic level transition and to generate a PWMris(0) interrupt when the TPU timer reaches Pwmris(0). The Pwmris(0) interrupt, in turn, is serviced at block 158 by the execution of blocks 160-168 as described above.

Figure 6A:
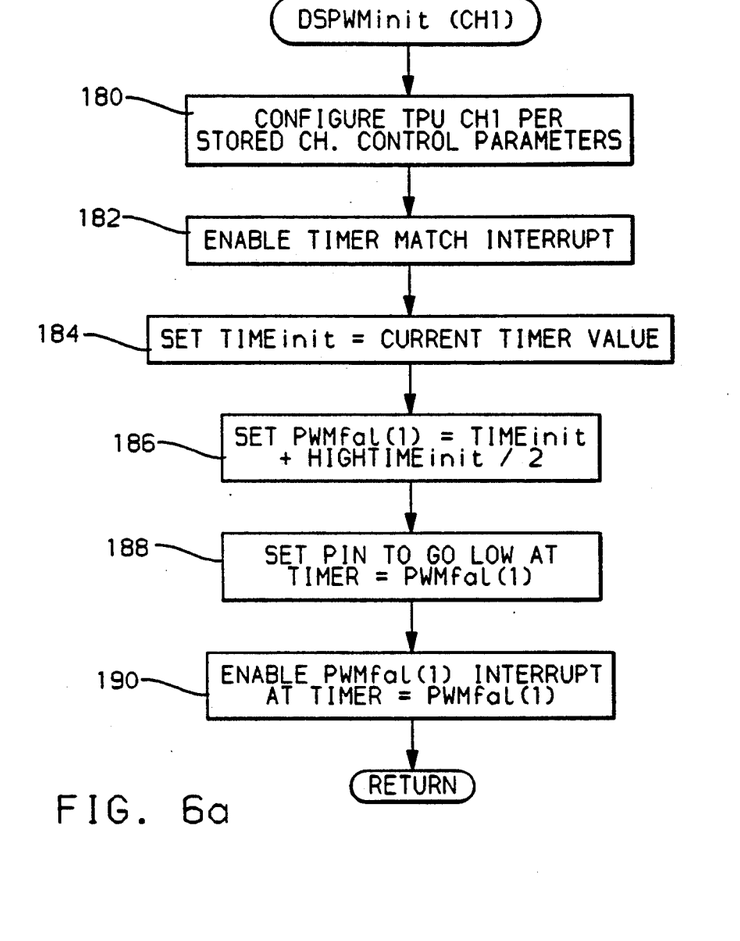
FIGS. 6a-6c depict flow diagrams representative of computer program instructions executed by the timer processor of FIG. 1 in the generation of the PWM waveform of FIG. 2b.

In a similar manner, the TPU timer channels CH1, CH2 and CH3 develop PWM control signals Pwm1, PWM2 and PWM3 for the three phases of machine 10. The flow diagrams of FIGS. 6a-6c detail the generation of the control signal PWM1 by TPU timer channel CH1, it being understood that the timer channels CH2 and CH3 operate in like manner. As with the SYNC signal channel CH0, the control signal channels CH1-CH3 are each initialized by the HOST CPU at system start-up, and thereafter generate rising edge and falling edge interrupts to compute the timing of the next logic transition, based in this case on the updated on-time data HIGHTIME and the computed rising edge Pwmris(0) of the SYNC signal. FIG. 6a details the initialization routine, FIG. 6b details the falling edge Pwmfal(1) interrupt service routine, and FIG. 6c details the rising edge PWMris(1) interrupt service routine.

In response to the HOST CPU generated initialization interrupt CH1init (block 102, FIG. 3a), the TPU executes the interrupt service routine of FIG. 6a. This involves setting the initial output condition of the channel (block 180), configuring the channel to generate an interrupt when the TPU timer matches a count stored in the channel register (block 182), and setting the initial time TIMEinit to the current TPU timer value (block 184).

In addition, block 186 computes the next fall time PWMfal(1) according to the sum (TIMEinit+HIGHTIMEinit/2), where HIGHTIMEinit is an initial predetermined on-time such as 50% of the PWM period PWMper. Finally, the blocks 188-190 configure the channel CH1 to undergo a high-to-low logic level transition and to generate a PWMfal(1) interrupt when the TPU timer reaches the PWMfal(1) value computed at block 186.

As indicated at block 102 of FIG. 3a, the foregoing initialization instructions are executed just after the SYNC channel initialization instructions. This results in an initial synchronization of the control signal on-periods with the rising edge PWMris(0) of the SYNC channel CH0. In subsequent operation, as explained below, the pulse centered synchronization is maintained by control signal channels CH1-CH3 by computing the respective rise and fall times based on the rising edge PWmris(0) computed at block 162 of the PWMris(0) interrupt service routine of FIG. 5a.

Figure 6B:
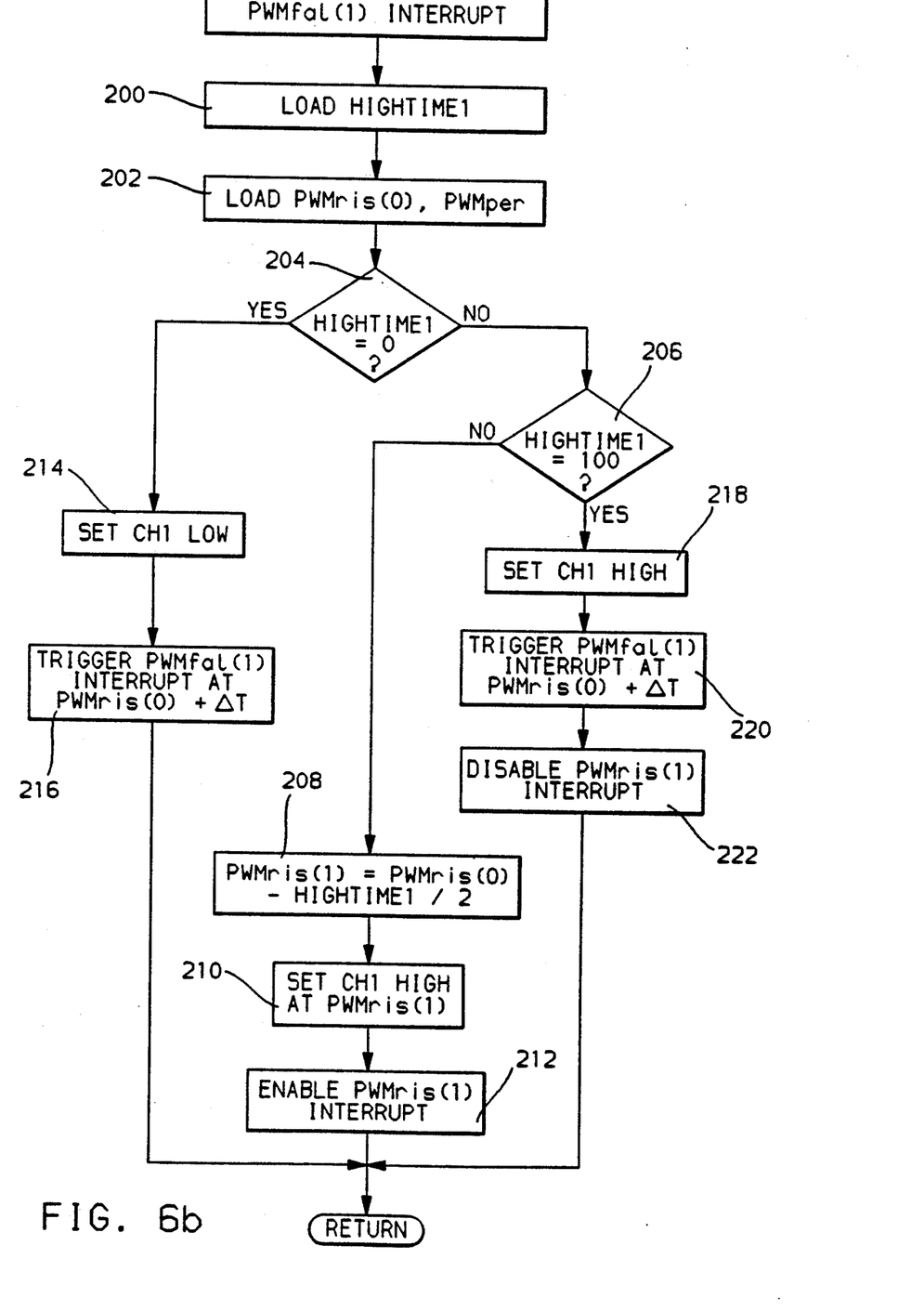

Referring to the PWMfal(1) interrupt service routine of FIG. 6b, the blocks 200 and 202 are first executed by the TPU to load the updated on-time data HIGHTIME1 from the timer channel register, and to load the SYNC channel rise time PWMris(0) and PWM period PWMper from the timer channel CH0. Decision blocks 204 and 206 determine if HIGHTIME1 is at its minimum or maximum level (HIGHTIME1=0 or HIGHTIME1=100). If not, the block 208 is executed to set the next rising edge PWMris(1) to (PWMris(0)−HIGHTIME1/2). This corresponds to [t5−(t6-t4)/2] in FIGS. 2a-2b. Then, the blocks 210-212 are executed to configure the channel CH1 to undergo a low-to-high logic level transition and to generate a PWMris(1) interrupt when the TPU timer reaches the PWMris(1) value computed at block 208.

If HIGHTIME1=0, as determined at block 204, the blocks 214-216 are executed in lieu of the blocks 208-212. The block 214 forces the channel CH1 control signal to a low logic level, and the block 216 configures the channel CH1 to generate a PWMfal(1) interrupt shortly after the TPU timer reaches the rising edge PWMris(0) of the SYNC channel CH0. It will be recalled that the on-time data HIGHTIME1 is updated at PWMris(0), and the block 216 schedules the next channel CH1 interrupt to occur shortly thereafter in order to determine if the HIGHTIME1=0 condition is still in effect. If so, the control signal will be held low by block 214; if not, the next rising edge PWMris(1) will be scheduled by blocks 208-212.

In similar manner, if HIGHTIME1=100, as determined at block 206, the blocks 218-222 are executed in lieu of the blocks 208-212. The block 218 forces the channel CH1 control signal to a high logic level, and the block 220 configures the channel CH1 to generate a PWMfal(1) interrupt shortly after the TPU timer reaches the rising edge PWMris(0) of the SYNC channel CH0. As with the HIGHTIME1=0 condition described above, this permits the TPU to determine if the HIGHTIME1=100 condition is still in effect. If so, the control signal will be held high by block 218; if not, the next rising edge Pwmris(1) will be scheduled by blocks 208-212. The block 222 serves to disable the generation of a PWMris(1) interrupt due to the forced logic level transition.

Figure 6C:
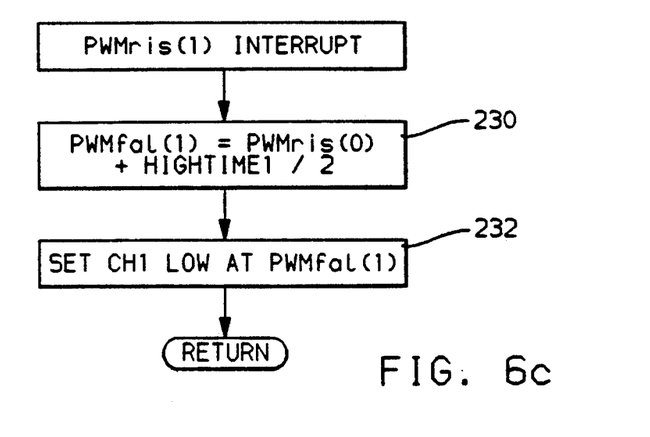

When the TPU timer matches the Pwmris(1) value computed at block 208, the TPU executes blocks 230-232 of the PWMris(1) interrupt service routine of FIG. 6c. This involves setting the next falling edge PWMfal(1) to (PWMris(0)+HIGHTIME1/2), and configuring the channel CH1 to undergo a high-to-low logic level transition when the TPU timer reaches the computed PWMfal(1) value.

In the above manner, the control of the present invention utilizes multiple TPU timer channels to create multiple inverter control signals having mutually synchronized on-times centered about the rising edge PWMris of a SYNC signal. The interrupt service routine latency which would ordinarily limit the ability to create short and long control signal on-times is avoided through the use of efficient service routines and by forcing the control signal to a high or low output condition when maximum or minimum duty ratios (HIGHTIMES) are commanded.

While described with respect to the illustrated embodiment, it is expected that various modifications will occur to those skilled in the art. For example, one could alternatively use a falling edge to synchronize the PWM machine control signal and/or provide HIGHTIME/2 values to the timer controller, with suitable modification of the timer routines. Also, the timer routines could be easily modified to provide full-on or full-off machine control outputs when the requested HIGHTIME approaches 0% and/or 100%; the exact switch points would be determined by software latency. In this regard, it will be understood that controls incorporating these and other modifications may fall within the scope of this invention, which is defined by the appended claims.

The embodiments of the invention in which an exclusive property or privilege is claimed are defined as follows:

1. In a control system for a multiple phase AC machine including an array of switching devices defining an inverter, a timer data register for storing PWM on-time data for respective switching devices of said inverter, a host processor interruptable to update said PWM on-time data based on a machine position encoder signal and a requested machine current, and a timer processor for generating conduction control signals for the switching devices of said inverter based on the PWM on-time data stored in said timer data register, a method of operation for said timer processor comprising the steps of:

generating a sync signal having leading edges occurring once per PWM cycle;

interrupting said host CPU at successive leading edges to initiate periodic updating of the PWM on-time data stored in said timer data register;

setting off-to-on and on-to-off transitions of said conduction control signals in accordance with the updated PWM on-time data such that said transitions are centered about a succeeding leading edge of said sync signal; and controlling the switching devices of said inverter in accordance with respective conduction control signals.

2. The control method set forth in claim 1, wherein the conduction control signals for each machine phase are developed by a controlled timer device, and the step of setting off-to-on and on-to-off conduction signal transitions for each machine phase, includes the steps of:

retrieving an updated Pwm on-time from said timer data register; and configuring a respective timer device so that said off-to-on transition is timed to occur (on-time)/2 prior to said succeeding leading edge of said sync signal, and said on-to-off transition is timed to occur (on-time)/2 after said succeeding leading edge of said sync signal.

3. The control method set forth in claim 1, wherein the setting of said off-to-on transitions is initiated at each on-to-off transition which precedes said succeeding leading edge of said sync signal, and includes the steps of:

retrieving an updated PWM on-time from said timer register;

dividing said retrieved PWM on-time into equal half periods; and for each conduction control signal, timing said off-to-on transition to occur one half period prior to said succeeding leading edge of said sync signal.

4. The control method set forth in claim 3, wherein the setting of said on-to-off transitions is initiated at each off-to-on transition which precedes said succeeding leading edge of said sync signal, and includes the step, for each conduction control signal, of:

timing said on-to-off transition to occur one half period after said succeeding leading edge of said sync signal.

5. The control method set forth in claim 1, wherein the steps performed by said timer processor result in a latency period during which said off-to-on transitions cannot be accurately set, and the control method includes the steps of:

detecting a predetermined high duty ratio operating condition; and forcing an immediate off-to-on transition of said conduction control signals in response to the detection of such condition.

6. The control method set forth in claim 1, wherein the steps performed by said timer processor result in a latency period during which said on-to-off transitions cannot be accurately set, and the control method includes the steps of:

detecting a predetermined low duty ratio operating condition; and forcing an immediate on-to-off transition of said conduction control signals in response to the detection of such condition.

* * * * *